United States Patent
Elliott

(10) Patent No.: US 8,746,082 B2
(45) Date of Patent: Jun. 10, 2014

(54) TORQUE SENSOR

(71) Applicant: KSR Technologies Co., Ridgetown (CA)

(72) Inventor: Ryan W. Elliott, Chatham (CA)

(73) Assignee: KSR IP Holdings LLC, Wilmington, DE (US)

( * ) Notice: Subject to any disclaimer, the term of this patent is extended or adjusted under 35 U.S.C. 154(b) by 0 days.

(21) Appl. No.: 13/888,464

(22) Filed: May 7, 2013

(65) Prior Publication Data

US 2013/0298698 A1 Nov. 14, 2013

Related U.S. Application Data

(60) Provisional application No. 61/644,083, filed on May 8, 2012.

(51) Int. Cl.
*G01L 3/10* (2006.01)

(52) U.S. Cl.
USPC .................................................. 73/862.325

(58) Field of Classification Search
USPC .................................................. 73/862.325
See application file for complete search history.

(56) References Cited

U.S. PATENT DOCUMENTS

| | | | |
|---|---|---|---|
| 6,644,134 B2 | 11/2003 | Laidlaw et al. | |
| 7,047,824 B2 | 5/2006 | Nakane et al. | |
| 7,363,825 B2 * | 4/2008 | Feng et al. | 73/862.325 |
| 7,954,389 B2 | 6/2011 | Maehara | |
| 8,286,507 B2 | 10/2012 | Bastian et al. | |
| 8,418,570 B2 * | 4/2013 | Maehara | 73/862.325 |
| 8,490,499 B2 * | 7/2013 | Behrens | 73/862.193 |
| 8,528,422 B2 * | 9/2013 | Sanada et al. | 73/862.335 |
| 2010/0029485 A1 | 2/2010 | Livore et al. | |
| 2012/0060628 A1 | 3/2012 | Sanada et al. | |

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

A torque sensor which detects a deflection angle between an input and an output shaft which are aligned with a shaft axis. An annular sine ring, annular cosine ring, and annular flux return ring, each constructed of a ferromagnetic material, are coaxially disposed around the shaft axis. A sine spoke has one end attached to the output shaft and its other end closely adjacent the sine ring and, similarly, a cosine spoke is secured to the output shaft at one end and is positioned closely adjacent the cosine ring at its other end. A pair of flux return spokes are also secured to the output shaft, each diametrically opposed from the sine or cosine spoke, and have their outer ends closely adjacent the return ring. A magnetic flux bridge is formed between the return flux ring and the sine ring as well as the cosine ring while magnetic sensors determine the magnitude of the flux across each bridge. A magnet is attached to the input shaft and positioned midway between the cosine spoke and sine spoke so that deflection between the input shaft and output shaft varies the magnitude of magnetic flux across each bridge.

8 Claims, 3 Drawing Sheets

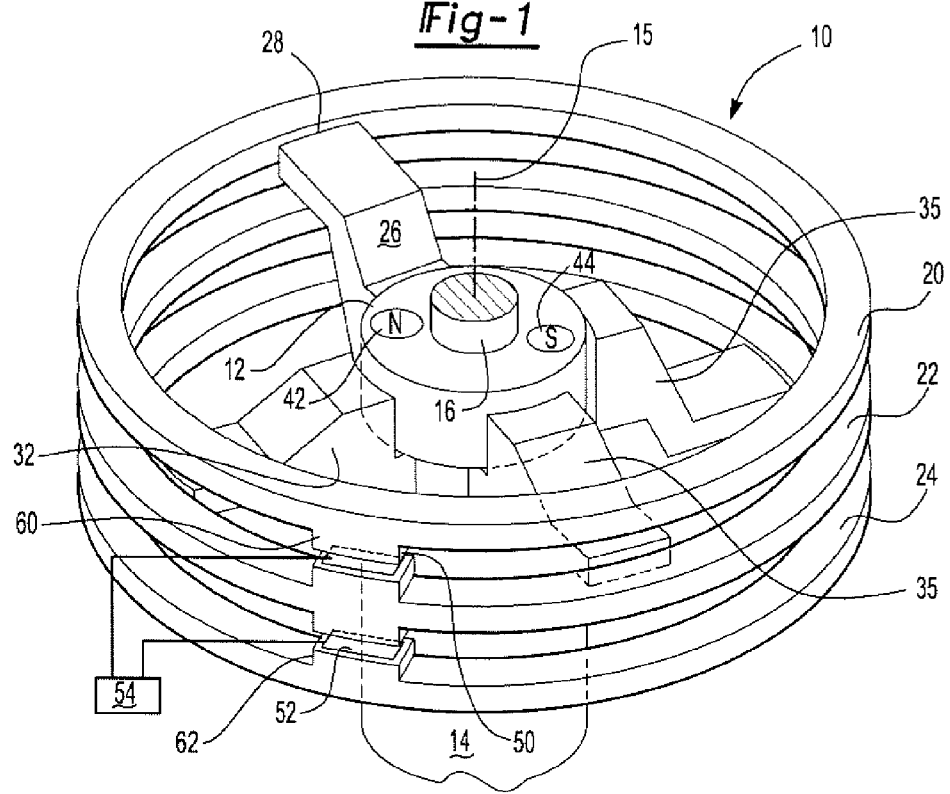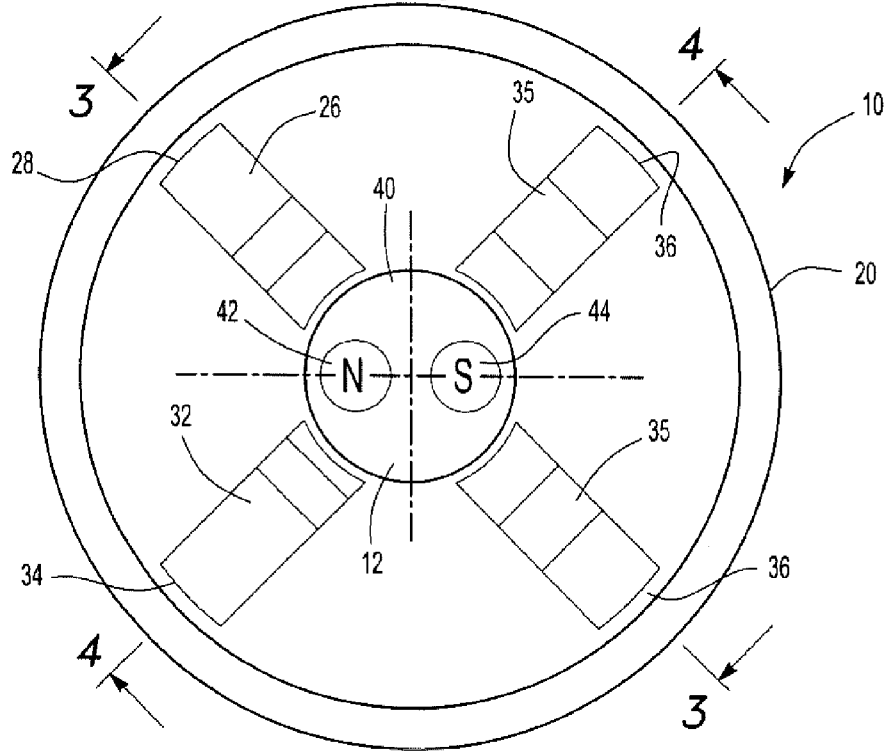

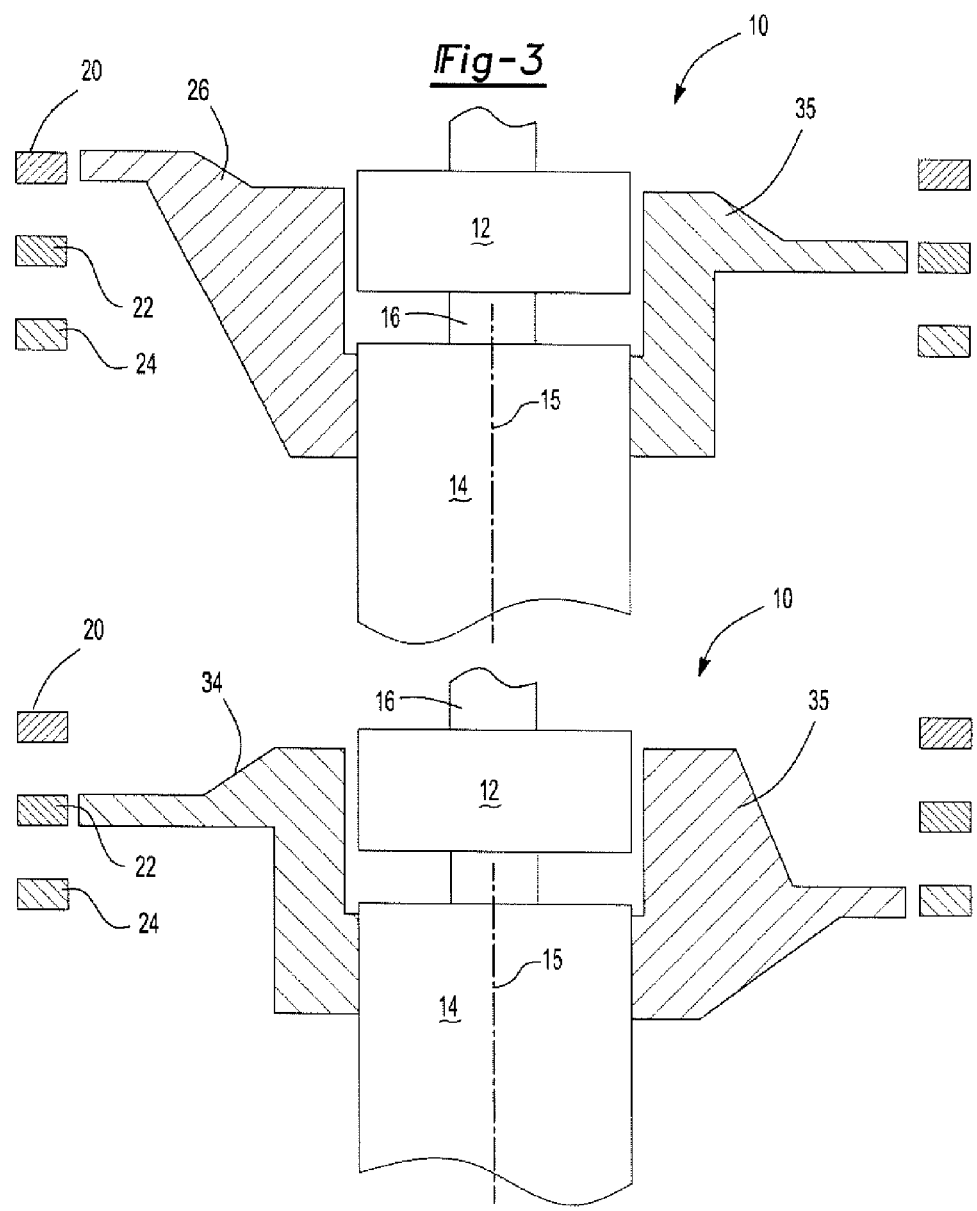

US 8,746,082 B2

TORQUE SENSOR

CROSS-REFERENCE TO RELATED APPLICATIONS

This application claims priority of U.S. Provisional Patent Application 61/644,083 filed May 8, 2012, the contents of which are incorporated herein by reference.

BACKGROUND OF THE INVENTION

I. Field of the Invention

The present invention relates generally to torque sensors and, more particularly, to a torque sensor which detects the deflection angle between the input and output shaft, such as a steering column for an automotive vehicle.

II. Description of Related Art

In steering systems of the type used in automotive vehicles, the steering system typically includes an input shaft connected to the steering wheel. The input shaft is then connected to an output shaft through a torsion bar and the output shaft, in turn, is mechanically or otherwise connected through linkage to the vehicle wheels. Consequently, rotation of the steering wheel pivots the wheels of the automotive vehicle through the torsion bar, output shaft, and steering linkage.

In many situations, it is highly desirable to determine the angular deflection between the input shaft and the output shaft of the steering mechanism. The degree of angular deflection between the input shaft and output shaft, i.e. the angular deflection of the torsion bar, is then utilized by the vehicle management system to determine the steering wheel torque and the amount of assist provided by the power steering. For example, when the vehicle is stopped or nearly stopped, e.g. during a vehicle parking situation, rotation of the steering wheel typically creates a relatively high angular deflection between the input shaft and the output shaft thus requiring increased power assistance from the power steering system in order to turn the vehicle wheels. This deflection, furthermore, rarely exceeds 4 degrees for automotive vehicles.

There have been previously known systems that are capable of monitoring the angular deflection between the input and output shafts of the steering column. These previously known systems typically employ a transducer which measures the angular torque between the steering input and output shafts. However, since the steering output shaft can rotate up to three or four full revolutions, it has been previously necessary for these previously known devices to provide a long length of electrical cable, typically a ribbon cable, within and around the steering column. Sufficient ribbon cable was necessary so that the ribbon cable could wind around the steering column two or three times to accommodate multiple rotations of the steering wheel.

This previously known solution, however, has not proven wholly satisfactory in use. For example, it is possible for the electrical connector to become entangled after extended use which can compromise or even destroy the electrical connection between the cable and the angle sensor between the steering input and output shafts. When this occurs, the overall operation of the torque sensor for the steering system is compromised.

There have been other types of systems which require multiple magnets, but these previously known systems require high manufacturing tolerances for accurate measurements.

SUMMARY OF THE PRESENT INVENTION

The present invention provides a torque sensor which generates an output signal proportional to the angular deflection between an input and output shaft which are joined together by a torsion bar while allowing the shafts to rotate freely.

In brief, the torque sensor of the present invention includes at least three fixed rings which are coaxially disposed around the input and/or output shafts. These three rings are constructed of a ferromagnetic material and include an upper sine ring, a lower cosine ring, and a middle flux return ring. However, this arrangement is arbitrary and, alternatively, two flux return rings may be used.

A sine spoke, cosine spoke, and two return flux spokes all are fixedly secured at their inner end to the output shaft so that all spokes rotate in unison with the output shaft. The spokes, as well as the rings, are each constructed of a soft ferromagnetic material with high permeability. The spokes are also circumferentially equidistantly spaced from each other with the sine and cosine spokes offset 90 degrees relative to each other and the two return spokes diametrically opposed respectively from the sine spoke and cosine spoke.

The outer periphery of the sine spoke is positioned closely adjacent, but not touching, the sine ring. Similarly, the cosine spoke is secured at its inner end to the output shaft and has its outer periphery closely adjacent, but not touching, the cosine ring.

The two flux return spokes also have their inner end attached to the output shaft and their outer ends closely adjacent, but not touching, the middle flux return ring. Alternatively, the middle return ring may be divided into two rings with one return spoke having its outer periphery closely adjacent one flux return ring and the other return spoke having its outer periphery closely adjacent, but not touching, the other flux return ring.

At least one and preferably a pair of axially opposed bridges extend between the sine ring and the return ring so that each bridge forms a return path for the magnetic flux. Similarly, at least one and preferably a pair of diametrically opposed bridges are also provided between the cosine ring and the return ring to likewise provide a path for the return magnetic flux from the cosine spoke.

A magnet, preferably a unipole magnet, is secured to the input shaft so that one pole, e.g. the north pole, is positioned in between the sine spoke and cosine spoke and preferably halfway between the sine spoke and cosine spoke. Consequently, in the preferred embodiment, the pole is positioned 45 degrees from both the sine as well as cosine spoke, although this angle may be varied as desired. Consequently, when the input shaft is angularly deflected relative to the output shaft in a first rotational position, the pole of the magnet becomes closer to the sine spoke so that an increased magnetic flux flows through the sine spoke and, simultaneously, a decreased flux flows through the cosine spoke. Angular deflection of the input shaft relative to the output shaft in the opposite rotational direction creates the opposite effect, i.e. an increased flux flow through the cosine spoke and decreased flux flow through the sine spoke.

Magnetic flux flow through either the sine or cosine spoke also flows through its associated ring, associated bridges, and the flux return spoke to complete the magnetic circuit. Consequently, by utilizing a magnetic flux sensor at the bridges between the sine ring, cosine ring, and flux return ring, the amount of flux can be measured individually through both the sine spoke and cosine spoke. These measurements are then coupled to an electronic circuit, such as an ASIC, which generates an output signal representative of the angular deflection between the input shaft and the output shaft. This angular deflection, in turn, is proportional to the amount of torque between the input and output shafts. The use of two rings and signals allows a ratio to make the resulting output independent of most external influences such as magnetic strength and mechanical tolerances.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating a preferred embodiment of the present invention;

FIG. 2 is a top plan diagrammatic view of the preferred embodiment of the invention;

FIG. 3 is a longitudinal sectional view through the sine spoke;

FIG. 4 is a longitudinal sectional view through the cosine spoke;

DETAILED DESCRIPTION OF A PREFERRED EMBODIMENT OF THE PRESENT INVENTION

Figure 7:
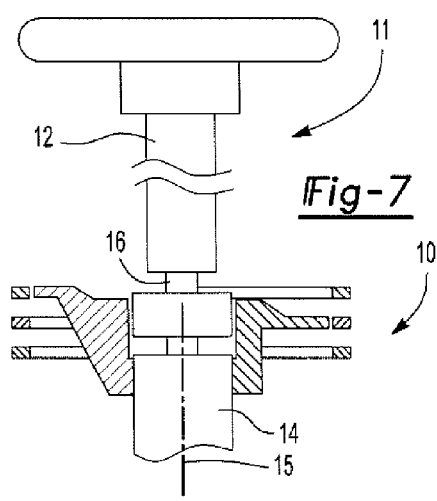
FIG. 7 is a diagrammatic view illustrating a steering column for an automotive vehicle.

With reference first to FIG. 7, a steering column 11 for an automotive vehicle is illustrated. The steering column 11 includes an input shaft 12 and output shaft 14 which are coaxial with each other. A torsion bar 16 is also axially aligned with both the input shaft 12 and output shaft 14. The torsion bar 16, however, allows a limited angular deflection between the input shaft 12 and output shaft 14.

With reference now to FIGS. 1-4, a preferred embodiment of the torque or angle deflection sensor 10 according to the present invention is shown. The sensor 10 is disposed coaxially around the input shaft 12 and/or output shaft 14 in a manner which will be subsequently described in greater detail.

The sensor 10 includes an upper sine ring 20, a middle flux return ring 22, and a lower cosine ring 24 although, optionally, the middle return ring 22 may be in the form of two separate and axially spaced apart flux return rings. These rings 20, 22, and 24 are constructed of a ferromagnetic material and preferably a soft ferromagnetic material with high permeability. All three rings 20, 22, and 24 are coaxially disposed around an axis 15 of the shaft assembly 11 so that the rings 20, 22, and 24 are also coaxial with the input shaft 12 and output shaft 14. The rings 20, 22, and 24 are fixed relative to the shaft assembly 11 so that the shaft assembly 11 rotates inside of the rings 20, 22, and 24.

With reference now to FIGS. 1 and 2, a sine spoke 26, also constructed of a ferromagnetic material, has its inner end connected to the output shaft 14 so that the sine spoke 26 rotates with the output shaft 14. An outer periphery 28 of the sine spoke 26 is positioned closely adjacent, but does not touch, the upper sine ring 20.

A cosine spoke 32, also constructed of a ferromagnetic material, has its inner end connected to the output shaft 14 so that the cosine spoke also rotates in unison with the output shaft 14. An outer periphery 34 of the cosine spoke is positioned closely adjacent, but does not touch, the lower cosine ring 24.

Still referring to FIGS. 1 and 2, two return spokes 35, each constructed of a ferromagnetic material, are also secured to and rotate in unison with the output shaft 14. An outer periphery 36 of each return spoke 35 is positioned closely adjacent, but does not touch, the middle or return ring 22.

As best shown in FIG. 2, the sine spoke 26, cosine spoke 32, and return spokes 35 are equidistantly circumferentially spaced from each other and thus spaced at 90 degree intervals around the output shaft 14. The sine spoke 26 and cosine spoke are angularly spaced 90 degrees apart from each other so that one return spoke 35 is diametrically aligned with the sine spoke 26 while the other return spoke 35 is diametrically aligned with the cosine spoke 32.

As best shown in FIGS. 1 and 2, a magnet 40, preferably a unipole magnet having a north pole 42 and south pole 44, is secured to the input shaft 12 so that the magnet 40 rotates in unison with the input shaft 12. Furthermore, the magnet 40 is aligned on the output shaft so that one pole, such as the north pole 42, is angularly positioned in between the sine spoke 26 and the cosine spoke 32, and preferably halfway in between the sine spoke 26 and cosine spoke 32, when the input shaft 12 and output shaft 14 are in an angularly undeflected position.

As best shown in FIG. 1, at least one, and preferably two diametrically opposed magnetic bridges 60 are provided between the sine ring 20 and the flux return ring 22. The magnetic bridge 60 thus completes the magnetic circuit between the sine spoke 26, sine ring 20, and the flux return ring 22. Similarly, at least one, and preferably a pair of diametrically opposed magnetic bridges 62 are also formed between the cosine ring 24 and the flux return ring 22. These bridges 62 thus complete the magnetic circuit between the cosine spoke 32, cosine ring 24, and the flux return ring 22.

When the input shaft 12 and output shaft 14 are in an undeflected position, i.e. where the input shaft 12 is angularly undeflected relative to the output shaft 14, the north pole 42 of the magnet 40 remains at a known position, preferably halfway, between the cosine spoke 32 and the sine spoke 26. Consequently, an equal amount of magnetic flux flows through the cosine spoke 32 and sine spoke 26. An equal amount of flux, in turn, flows through the return ring 22 and return spokes 35 as well as their associated bridges 60 and 62.

Figure 5:
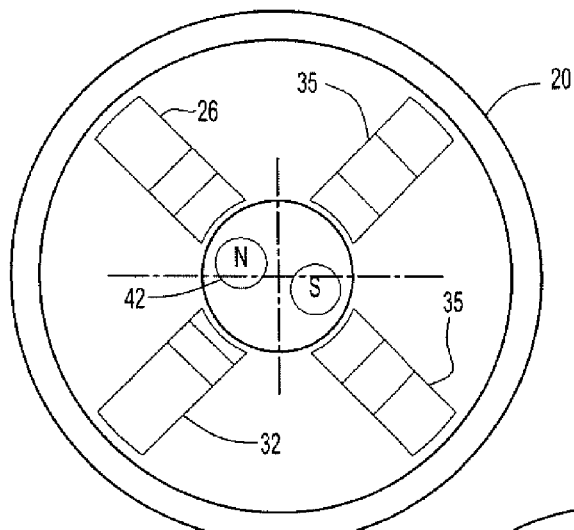
FIG. 5 is a diagrammatic top view illustrating the operation of the present invention showing deflection of the input shaft relative to the output shaft in one direction.
Figure 6:
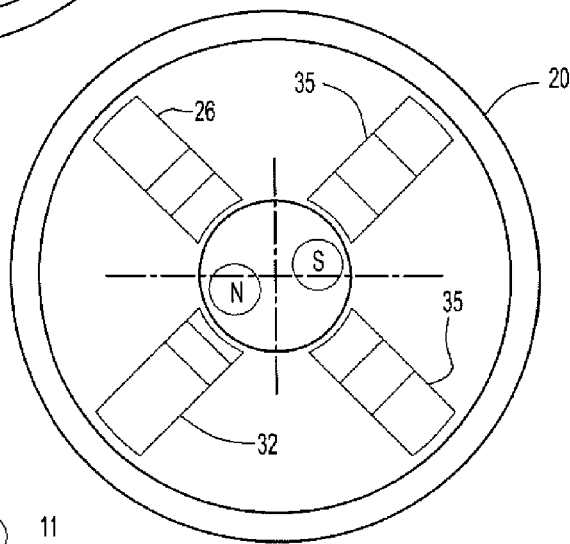
FIG. 6 is a view similar to FIG. 5, but illustrating deflection of the input shaft and output shaft in the opposite direction.

However, in the event that the input shaft 12 is angularly deflected relative to the output shaft 14 in a clockwise direction, as shown in FIG. 5, the north pole 42 of the magnet 40 becomes closer to the sine spoke 26 than the cosine spoke 32. When this occurs, an increased flow of magnetic flux occurs through the sine spoke 26 and through its associated sine ring 20 and magnetic bridge 60. Simultaneously, a decreased flow of magnetic flux occurs through the cosine spoke 32, cosine ring 34, and its associated magnetic bridge 62. Angular deflection of the input shaft 12 relative to the output shaft 14 in the opposite direction as shown in FIG. 6 results in the opposite condition, i.e. a decreased flux flow through the sine magnetic circuit and an increased flux flow through the cosine magnetic circuit.

With reference to FIG. 1, in order to detect the differences in flux flow between the sine and cosine magnetic circuits, a magnetic sensor 50 is positioned at the magnetic bridge 60 and thus measures the flux flow through the magnetic bridge 60. Similarly, a second magnetic sensor 52 is positioned between the magnetic bridge 62 in the cosine circuit and measures the amount of flux through the cosine circuit.

Both sensors 50 and 52 are connected to an electronic circuit 54, such as an ASIC, which is programmed to generate an output signal representative of the degree of angular deflection of the input shaft 12 relative to the output shaft 14 as a function of the magnitude of the magnetic flux detected by the flux sensors 50 and 52. As previously described, the amount of flux flow through the bridges 60 and 62 varies inversely depending on the magnitude and angular direction of deflection.

From the foregoing, it can be seen that the present invention provides a simple, yet unique, torque sensor for rotatable shafts which, unlike many previously known torque sensors, does not require a physical connection with either shaft. As such, unlike many previously known systems, there is no reason to wire a cable between the shaft and the sensor electronics.

Having described my invention, however, many modifications thereto will become apparent to those skilled in the art to which it pertains without deviation from the spirit of the invention as defined by the scope of the appended claims.

I claim:

1. A torque sensor which detects a deflection angle between an input shaft and an output shaft, the input shaft and output shaft being aligned with a shaft axis, said sensor comprising:
    an annular sine ring, annular cosine ring and annular flux return ring coaxially disposed around the shaft axis, said sine ring, cosine ring and flux return ring being constructed of a ferromagnetic material and fixed against rotation relative to the input and output shafts,
    a sine spoke secured to one of said input and output shafts and having an outer periphery closely adjacent said sine ring,
    a cosine spoke secured to said one of said input and output shafts and having an outer periphery closely adjacent said cosine ring, said cosine spoke being angularly offset from said cosine spoke by a predetermined angle,
    a pair of flux return spokes,
    one flux return spoke being connected at one end to said one of said input and output shafts and diametrically opposed from said sine ring, said one flux return spoke having an outer periphery closely adjacent said flux return ring,
    the other flux return spoke being connected at one end to said one of said input and output shafts and diametrically opposed from said cosine ring, said one flux return spoke having an outer periphery closely adjacent said flux return ring,
    all of said spokes being constructed of a ferromagnetic material,
    a sine magnetic flux bridge formed between said sine ring and said flux return ring and a cosine magnetic flux bridge formed between said cosine ring and said flux return ring,
    a pair of flux sensors, one flux sensor positioned to measure the magnitude of flux passing through each bridge,
    a magnet attached to the other of said input and output shafts, said magnet having a pole positioned angularly between both said sine spoke and said cosine spoke, and
    a circuit which receives the signals from the flux sensors and generates an output signal representative of the angular deflection between the input shaft and output shaft.

2. The torque sensor as defined in claim 1 wherein said magnet is a unipole magnet.

3. The torque sensor as defined in claim 1 wherein said spokes are connected to said output shaft.

4. The torque sensor as defined in claim 1 wherein one bridge contains an area of reduced spacing between said sine ring and said flux return ring.

5. The torque sensor as defined in claim 4 wherein the other bridge contains an area of reduced spacing between said cosine ring and said flux return ring.

6. The torque sensor as defined in claim 1 wherein said input and output shaft comprises steering wheel input and output shafts for an automotive vehicle.

7. The torque sensor as defined in claim 1 wherein said magnet is positioned angularly midway between said sine spoke and said cosine spoke.

8. The torque sensor as defined in claim 1 wherein said predetermined angle is substantially 90 degrees.

\* \* \* \* \*